United States Patent [19]

Simon et al.

[11] Patent Number: 5,110,673
[45] Date of Patent: May 5, 1992

[54] FUSIBLE ADHESIVES FOR TEXTILE FASTENING INSERTS

[75] Inventors: Ulrich Simon, Herne; Heinz Scholten, Haltern, both of Fed. Rep. of Germany

[73] Assignee: Huels Aktiengesellschaft, Marl, Fed. Rep. of Germany

[21] Appl. No.: 489,095

[22] Filed: Mar. 6, 1990

[30] Foreign Application Priority Data

Nov. 24, 1989 [DE] Fed. Rep. of Germany ....... 3938880

[51] Int. Cl.$^5$ ............ B32B 5/02; B32B 5/06
[52] U.S. Cl. ............ 428/236; 428/261; 428/280; 428/355
[58] Field of Search ........... 428/261, 280, 355, 236; 544/222; 524/101

[56] References Cited

U.S. PATENT DOCUMENTS

| | | | |
|---|---|---|---|
| 3,918,218 | 11/1975 | Zoiss | 51/298 |
| 3,919,218 | 11/1975 | Schmitt et al. | 544/222 |
| 4,314,927 | 2/1982 | Theysohn et al. | 524/101 |
| 4,317,766 | 3/1982 | Kawasaki et al. | 524/101 |
| 4,363,890 | 12/1982 | Ohshita et al. | 524/101 |
| 4,447,594 | 5/1984 | Cohen et al. | 524/101 |
| 4,459,389 | 7/1984 | Mumcu et al. | 428/261 |
| 4,487,895 | 12/1984 | Feldmann et al. | 428/261 |
| 4,518,729 | 5/1985 | Breidenbach et al. | 524/101 |
| 4,605,596 | 8/1986 | Fry | 524/101 |
| 4,663,377 | 5/1987 | Hambach et al. | 524/196 |
| 4,689,361 | 8/1987 | Mumcu et al. | 524/196 |
| 4,698,424 | 10/1987 | Engbert et al. | 524/101 |

FOREIGN PATENT DOCUMENTS

| | | |
|---|---|---|
| 3023918 | 1/1982 | Fed. Rep. of Germany . |
| 0004953 | 1/1979 | Japan ............ 524/101 |
| 1451837 | 10/1976 | United Kingdom . |

*Primary Examiner*—Kriellion S. Morgan
*Attorney, Agent, or Firm*—Oblon, Spivak, McClelland, Maier & Neustadt

[57] ABSTRACT

Fusible adhesives which contain a copolyamide and an isocyanatoisocyanurate obtained by trimerization of isophorone diisocyanate do not undergo crosslinking during melt mixing, exhibit an improved resistance to decomposition during washing and dry cleaning, and are useful for coating textile fastening inserts.

10 Claims, No Drawings

FUSIBLE ADHESIVES FOR TEXTILE FASTENING INSERTS

BACKGROUND OF THE INVENTION

1. Field of the Invention

The present invention relates to fusible adhesives and textile fastening inserts which are coated with the fusible adhesive by the powder point method.

2. Discussion of the Background

Fusible (hot-melt) adhesives for coating textile fastening inserts based on copolyamides are known and have proven themselves to be useful. Improved products are obtained if melamine resins are added as crosslinking agents (See: DE-OS 23 07 346).

However, the process of preparation of the adhesives has been found to be problematic in the systems with crosslinking agents. Thus, it is necessary to be able to mix the two substances in the melt and apply the adhesive, without crosslinking taking place. During the fixation process, however, the desired crosslinking should take place within 10 to 20 seconds.

In view of this difficulty, blocked isocyanates might be considered as advantageous crosslinking agents. Among persons skilled in the art, however, blocked isocyanates are considered as unsuitable (see Dermil Research Ltd.—Technical Report dated Jul. 11, 1985), since they yield toxic and corrosive decomposition products.

Thus, there remains a need for fusible adhesives for coating textile fastening inserts which can be prepared from materials which do not undergo crosslinking during melt mixing and which have an improved resistance to decomposition during washing and dry cleaning. There is also a need for textile fastening inserts coated with such an adhesive.

SUMMARY OF THE INVENTION

Accordingly, one object of the present invention is to provide fusible adhesives for coating textile fastening inserts which do not undergo crosslinking while being mixed in the melt.

Another object of the present invention is to provide textile fastening inserts which exhibit improved resistance to decomposition during washing and dry cleaning.

A further object of the present invention is to provide textile fastening inserts which are coated with a fusible adhesive which does not undergo crosslinking while being mixed in the melt and exhibits an improved resistance to decomposition during washing and dry cleaning.

These and other objects which will become apparent during the course of the following detailed description have been achieved by employing a fusible adhesive containing:

(i) 90 to 99% by weight of a copolyamide having a melting point in the range of 80° to 150° C. and a solution viscosity, $\eta_{rel}$, in the range of 1.3 to 1.7; and (ii) 1 to 10% by weight of an isocyanatoisocyanurate obtained by trimerization of isophorone diisocyanate.

DETAILED DESCRIPTION OF THE PREFERRED EMBODIMENTS

As the basic material for the fastening inserts, fabric, knitted fabrics, and felted materials, can be used. These may be produced from natural and/or synthetic fibers, and different types of fibers can also be combined with one another. Suitable materials are described in Peter Sroka, *Handbuch der textilen Fixiereinlagen*, 2nd edition, Sinus-Verlag GmbH, Krefeld, Pages 28 to 35 (1983).

For the fusible adhesive, any known copolyamide suitable for this purpose can be used. Suitable copolyamides are produced from at least two different polyamide forming monomers, e.g., lactams and/or salts of dicarboxylic acids and diamines. Instead of salts, dicarboxylic acids and diamines can also be placed in the reaction vessel separately.

Preferred copolyamides have the following monomer compositions (% by weight ):

(a) 40% of laurolactam, 30% of caprolactam, and 30% of the salt of adipic acid and hexamethylenediamine ("AH salt");

(b) 60% of laurolactam, 20% of caprolactam, and 20% of "AH salt";

(c) 25% of laurolactam, 25% of caprolactam, 25% of aminoundecanoic acid and 25% of the salt of azelaic acid and hexamethylenediamine;

(d) 60% of laurolactam, 20% of caprolactam, and 20% of the salt of adipic acid and isophoronediamine;

(e) 40% of laurolactam, 30% of caprolactam, and 30% of the salt of dodecanedicarboxylic acid and methylpentamethylene diamine.

Other copolyamides that can be used as fusible adhesives are described in DE-PSS 12 53 499 and 15 94 233 and DE-OSS 19 39 758, 23 24 159, 23 24 160, 24 36 430, 29 20 416, 32 48 776 and 25 09 736.

The copolyamides have a melting point of 80° to 150° C., preferably 90° to 136° C. and a solution viscosity, $\eta_{rel}$, in the range of 1.3 to 1.7. The solution viscosity is determined according to DIN 53 727, specifically with a 0.5% by weight solution of the copolyamide in m-cresole at 25° C.

The second component is an isocyanatoisocyanurate obtained by trimerization of isophorone diisocyanate, which can be produced, for example, as described in U.S. Pat. No. 3,919,218. The product, obtained in this manner, is always a mixture of reaction products with different molecular weights. The mixture is generally not separated into fractions but rather used as a crosslinking agent as such.

On the basis of the available analytical results, the mixture can be characterized as follows. It consists essentially of trimers and reaction products thereof with additional monomer. The trimers essentially correspond to the following Formulae A and B. The trimers of the two formulas each exist as isomer mixtures.

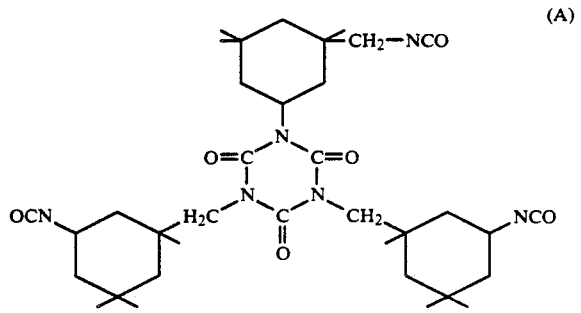

-continued

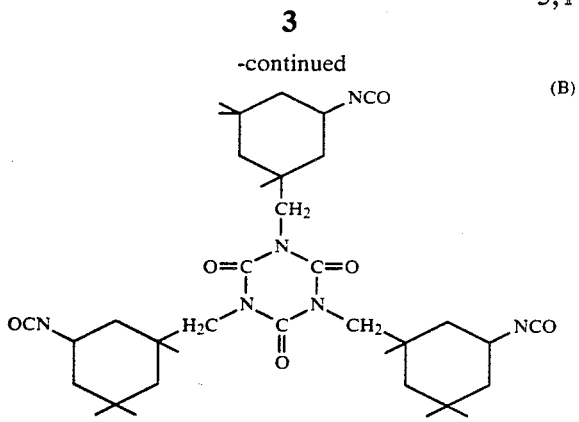

The present fusible adhesives contain 90 to 99% by weight, preferably 90 to 98% by weight, of one or more of the above-mentioned copolyamides and 1 to 10% by weight, preferably 2 to 10% by weight, of the isocyanatoisocyanurate described above.

The fastening inserts according to the invention are coated according to the powder point process. The application weight of the fusible adhesive is in the range of 10 to 28 g/m², preferably 18 to 24 g/m².

The fastening inserts according to the invention demonstrate particularly good resistance to washing and reduced shrinkage, while maintaining good general properties.

Other features of the invention will become apparent in the course of the following descriptions of exemplary embodiments which are given for illustration of the invention and are not intended to be limiting thereof.

EXAMPLES

In the Examples, the adhesion strength was determined according to DIN 54 310.

Examples designated with letters are Comparative Examples.

EXAMPLES 1 TO 4 AND COMPARATIVE EXAMPLE A

A commercially available isocyanatoisocyanurate of the type described above was ground to a powder with a mean particle diameter of <200 μm and was mixed in a powder mixer with a copolyamide of the following composition:

60% by weight of laurolactam; 25% by weight of caprolactam; and 15% by weight of the salt of hexamethylenediamine and adipic acid; which had a fusion point of 135° C. and $\eta_{rel}=1.5$.

The amount of the isocyanatoisocyanurate contained in the adhesive for each Example is given in wt. % in the Table.

The fusible adhesive obtained in this way was applied to a cotton washable fastening insert with a weight per area of 80 g/m² using a powder point apparatus (Saladin System) with a 28 mesh application roller. The coated insert was bonded to a commercially available shirt fabric (woven polyester/cotton blend) on a press. The fastening time was 20 sec; the fastening pressure was 1,500 hPa; and the fastening temperature was 160° C.

The fusible adhesive in Comparative Example A did not contain any isocyanatoisocyanurate.

EXAMPLE 5 AND COMPARATIVE EXAMPLE B

The copolyamide used in Examples 1 to 4 was replaced by a copolyamide with the following composition:

40% by weight of laurolactam; 30% by weight of caprolactam; and 30% by weight of the salt of equivalent amounts of methylpentamethylenediamine and dodecanedicarboxylic acid; which had a fusion point of 108° C. and $\eta_{rel}=1.55$.

The fusible adhesive of Example 5 contained 5 wt. % of the isocyanatoisocyanurate, and the fusible adhesive of Comparative Example B did not contain any isocyanatoisocyanurate.

The procedure was otherwise as in Examples 1–4.

EXAMPLE 6

The copolyamide used in Examples 1 to 4 was replaced by a copolyamide having the composition:

40% by weight of laurolactam; 30% by weight of caprolactam; and 30% by weight of the salt of dodecanedicarboxylic acid and (5% by weight excess) methylpentamethylenediamine; which had a fusion point of 108° C. and $\eta_{rel}=1.44$.

The fusible adhesive of Example 6 contained 5 wt.% of isocyanatoisocyanurate, and the procedure was otherwise as outlined above.

ADHESION TESTS

To determine the adhesion, 30 cm × 5 cm strips were prepared. Some strips were tested without pretreatment, others were first washed in the hot cycle in a household washing machine ten times, and others were tested after being commercially dry-cleaned ten times. The adhesion testing was carried out using a ZWICK pulling machine.

The results are shown in the following table.

TABLE

| Ex. | Amount of isocyanato-isocyanurate (wt. %) | Adhesive Application weight (g/m²) | Adhesion Strength [N/5 cm] | | |
|---|---|---|---|---|---|
| | | | No Pre-treat. | After Washing | After Dry-Cleaning |
| 1 | 1 | 12 | tearing[a] | 12 | 22 |
| 2 | 3 | 12 | tearing | 14 | 26 |
| 3 | 5 | 12 | tearing | 13 | 24 |
| 4 | 10 | 13 | tearing | 18 | 24 |
| A | without | 12 | 20 | 5 | 19 |
| 5 | 5 | 13 | tearing | 1 | 22 |
| B | without | 14 | tearing | failed[b] | 20 |
| 6 | 5 | 11 | 15 | 6 | 20 |

[a]Tearing occurred before the insert and fabric separated.
[b]Adhesive failed during washing.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A textile fastening insert, comprising a fabric coated with a fusible adhesive, comprising:
   (i) 90 to 99 wt. % of a copolyamide having a melting point in the range of 80° to 150° C. and a solution viscosity, $\eta_{rel}$, in the range of 1.3 to 1.7; and
   (ii) 1 to 10 wt. % of an isocyanatoisocyanurate obtained by trimerization of isophorone diisocyanate.

2. The textile fastening insert of claim 1, wherein the amount of said copolyamide is 90 to 98 wt. % and the amount of said isocyanatoisocyanurate is 2 to 10 wt. %.

3. The textile fastening insert of claim 1, wherein the melting point of said copolyamide is in the range of 90° to 136° C.

4. The textile fastening insert of claim 1, wherein said copolyamide is produced from monomers which are selected from the group consisting of a lactam and a salt of a dicarboxylic acid and a diamine.

5. The textile fastening insert of claim 4, wherein said lactam is selected from the group consisting of laurolactam and caprolactam.

6. The textile fastening insert of claim 4, wherein said salt of a dicarboxylic acid and a diamine is selected from the group consisting of the salt of adipic acid and hexamethylenediamine, the salt of azelaic acid and hexamethylenediamine, the salt of adipic acid and isophoronediamine, and the salt of dodecanedicarboxylic acid and methylpentamethylenediamine.

7. The textile fastening insert of claim 1, wherein said fusible adhesive is coated on said fabric in an amount of from 10 to 28 g/m$^2$.

8. The textile fastening insert of claim 7, wherein said fusible adhesive is coated on said fabric in an amount of from 18 to 24 g/m$^2$.

9. The textile fastening insert of claim 1, wherein said fabric is produced from natural fibers.

10. The textile fastening insert of claim 1, wherein said fabric is produced from synthetic fibers.

* * * * *